Nov. 10, 1970 W. T. WALTERS ET AL 3,539,915
PIPELINE INSPECTION APPARATUS FOR DETECTION OF LONGITUDINAL
DEFECTS BY FLUX LEAKAGE INSPECTION OF
CIRCUMFERENTIAL MAGNETIC FIELD
Filed Nov. 3, 1967
3 Sheets-Sheet 1
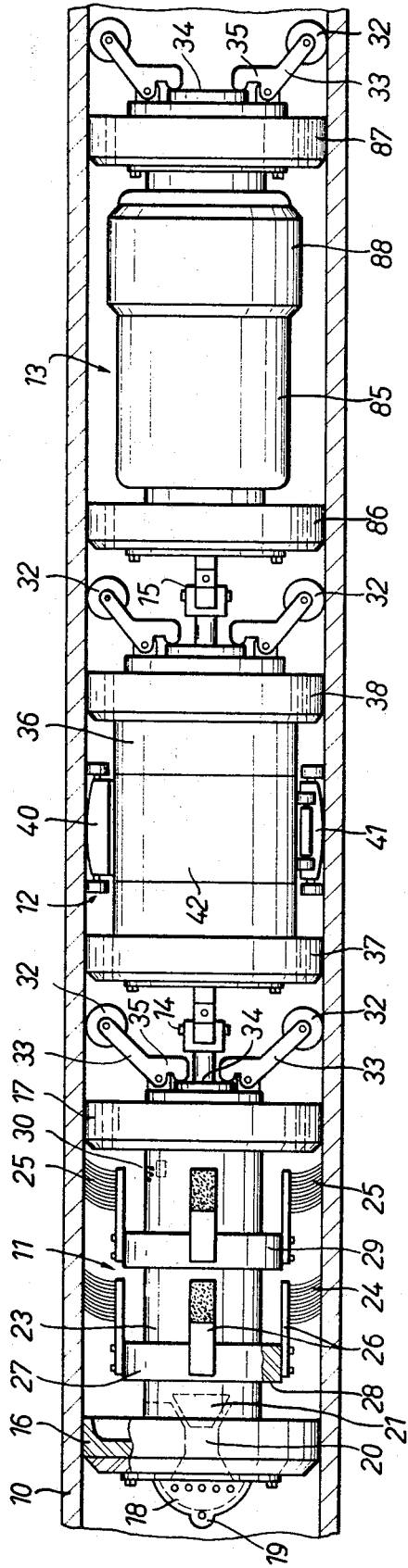
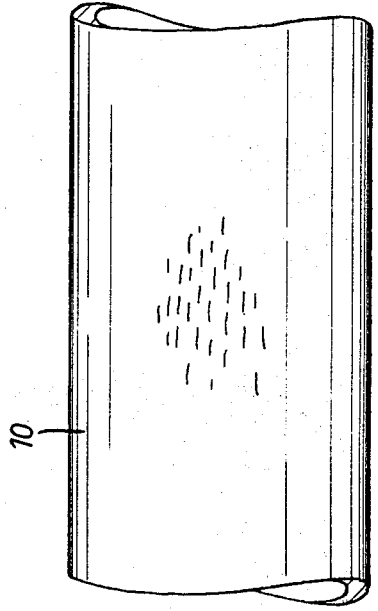
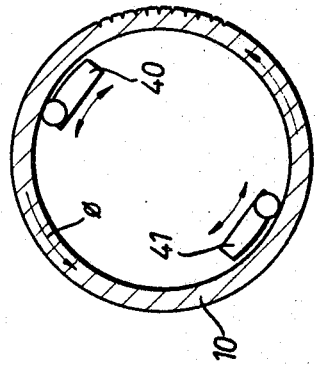
Wm. T. WALTERS,
F. M. WOOD & A. E. CROUCH
INVENTORS
BY Arnold, Roylance,
Kruger & Durkee
ATTORNEYS Nov. 10, 1970  W. T. WALTERS ET AL  3,539,915
PIPELINE INSPECTION APPARATUS FOR DETECTION OF LONGITUDINAL
DEFECTS BY FLUX LEAKAGE INSPECTION OF
CIRCUMFERENTIAL MAGNETIC FIELD Filed Nov. 3, 1967  3 Sheets-Sheet 2

Wm. T. WALTERS,
F. M. WOOD & A. E. CROUCH
INVENTORS

BY Arnold, Roylance,
Kruger & Durkee
ATTORNEYS

Wm. T. WALTERS,
F. M. WOOD & A. E. CROUCH
INVENTORS

BY Arnold, Roylance,
Kruger & Durkee
ATTORNEYS

United States Patent Office 3,539,915
Patented Nov. 10, 1970

3,539,915
PIPELINE INSPECTION APPARATUS FOR DETECTION OF LONGITUDINAL DEFECTS BY FLUX LEAKAGE INSPECTION OF CIRCUMFERENTIAL MAGNETIC FIELD
William T. Walters, Houston, Fenton M. Wood, Sugarland, and Alfred E. Crouch, Houston, Tex., assignors to American Machine & Foundry, New York, N.Y., a corporation of New Jersey
Filed Nov. 3, 1967, Ser. No. 680,452
Int. Cl. G01r 33/12
U.S. Cl. 324—37                                    4 Claims

ABSTRACT OF THE DISCLOSURE

This application discloses pipeline inspection apparatus of the type propelled through a pipeline by the product being transported. The apparatus includes means for producing circumferential residual magnetic flux in the pipeline wall, along with flux leakage detector means rotating around the interior surface of the pipe wall to detect flux deflected out of the wall by longitudinally oriented flaws, principally stress corrosion cracks in the exterior of the pipe wall. Circumferential flux is produced by high current pulses applied to successive overlapping longitudinal sections of the pipeline using axially spaced conductive brushes or spurs. Circuitry for producing the sequential pulses is included.

---

Natural gas is transported from gas producing fields to major population centers throughout the country by means of high pressure gas transmission pipelines. Many thousands of miles of these high pressure lines exist today, often in heavily populated areas. Even though originally placed in regions of low population density, the pipelines are now found in areas of high density due to urban growth. Many of the lines are now becoming quite old and so the potential hazard to human life and to property has now become significant, even though the hazard was negligable years ago when the lines were new and far removed from most population centers. To avoid the occurrence of further catastrophic failures, the pipeline ruptures which have occurred in the past have been carefully analyzed and the causes for such failures discerned. The likelihood of rupture of a pipeline which has been in service for many years can be predicted from data accumulated by inspection of the line.

It has been determined from analysis of past failures that one of the siganficant causes of rupture of pipelines is the occurrance of so-called stress corrosion cracks, these being cracks which form in the outside surface of the pipeline and extend longitudinally, i.e., parallel to the axis of the pipeline, and penetrate radially, perpendicular to the pipeline surface. These stress corrosion cracks occur in groups, and when several occur and grow in one longitudinal-diametric plane, the pipeline wall will be weakened to such degree that the pipe bursts under the pressure of the natural gas. The exact cause of these stress corrosion cracks is somewhat indefinite; however, it is observed that the cracks occur even in lines protected from corrosion by exterior coatings of insulating material as well as electrical cathodic protection. The stress corrosion cracks are not in the line when it is newly installed, and the cracks begin to form as minute pits and take several years to grow large enough to be a serious hazard. If the cracks are detected early before they become critical in size and number then, of course, the defective section of a pipeline can be replaced and a potential gas pipeline failure hazard removed.

Pipeline inspection apparatus of many types has been developed in the past. For the inspection of existing lines buried in the ground, one of the more successful devices is the inspection pig which is propelled through the pipeline by the product being transported, the devire scanning the pipeline wall and recording detected information for subsequent review. Many different techniques for scanning and detecting flaws in pigging apparatus of this type have been utilized. Magnetizers and flux leakage detectors, utrasonic devices, and photoelectric techniques are some that have been proposed. However, detection of small radial longitudinal cracks on the exterior of the pipeline wall is not readily accomplished by the inspection apparatus now available. Magnetic inspection apparatus of the type set forth in copending application Ser. No. 680,553, filed herewith, and assigned to the assignee of the persent invention, is responsive primarily to flaws or pits having a significant dimension in the circumferential direction so that magnetic flux traveling along the length of the pipeline parallel to the pipeline axis is deflected out of the wall being inspected. Longitudinal stress corrosion cracks in early stages produce little such axial flux deflection.

It is therefore a principal feature of this invention to provide pipeline inspection apparatus capable of detecting small cracks in the exterior wall of the pipeline extending parallel to the axis of the line, particularly inspection apparatus adapted to be propelled through the interior of the pipeline over substantial lengths under propulsion of the product being transported. Another feature of the invention is the provision of techniques for scanning the interior wall of a pipeline to detect so-called "stress corrosion cracks." Further features of significance include a circuitry especially adapted for providing the high amplitude current pulses for purposes of this type.

In accordance with an embodiment of the invention, pipeline inspection apparatus is provided in the form of a "pig" assembly including a magnetizing device which creates residual magnetic flux in the walls of the pipeline in a circumferential direction so that the magnetic flux will be perpendicular to the stress corrosion cracks and will thus be deflected out of the pipeline wall. The inspection apparatus includes flux leakage detector devices for scanning adjacent the interior wall of the pipeline, the detector devices ordinarily being shoe assemblies rotated about the axis of the pipeline or in some manner scanning the pipe walls. Flux detectors such as detector coils are positioned to intercept flux deflected out of the pipe walls by the longitudinal cracks. The detector shoe assemblies may be rotated by an induction motor-type arrangement powered from a DC source and inverter. The circumferential magnetic flux may be produced by axially spaced conductors engaging the pipeline wall, preferably spurs or wire brushes, to which large magnitude, short duration, current pulses are applied. The current pulses produced in overlapping longitudinal sections result in residual circumferential flux. The current pulses may be produced by sequentially discharging banks of capacitors to maintain a high current level for the proper length of time so that a high level of magnetization results.

The novel features believed characteristic of this invention are set forth in the appended claims. The invention itself, however, as well as further objects and advantages thereof, will best be understood by reference to the following detailed description of particular embodiments, when read in conjunction with the accompanying drawings, which form a part of this specification, wherein:

FIG. 1 is an elevation view in section of a length of pipeline containing pipeline inspection apparatus according to one embodiment of the invention;

FIG. 1a is a pictorial view of a section of pipeline illustrating longitudinal cracks of the type to be detected by the inspection apparatus of the invention;

FIG. 1b is a cross-sectional view of the section of pipeline of FIG. 1a, showing the detector shoes of the inspection apparatus of FIG. 1;

Figure 2:
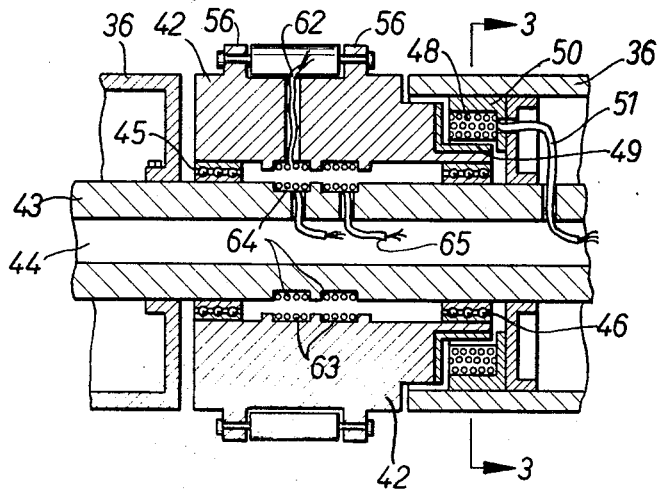
FIG. 2 is an enlarged detail view in section of the rotor assembly and motive power means therefor used in the transducer section of the inspection apparatus of FIG. 1, according to the invention.

Referring particularly to FIG. 1 of the drawings, pipeline inspection apparatus is illustrated which is of the type propelled through a pipeline 10 by the fluid product being transported in the pipeline. This type of self-propelled, self-contained inspection apparatus, usually referred to as a "pig," is for the purpose of scanning the pipeline walls for flaws, pits, and other defective conditions, and recording this information for subsequent study which may result in a decision to repair or replace a section of the line. The pig must negotiate turns and discontinuities in the pipeline and so is jointed in construction to permit a fairly tight turning radius. Variations in pipeline diameter, as well as obstructions such as valve seats and debris in the line, require that the diameter of the pig be somewhat flexible, while collisions with debris and discontinuities in the line require the pig to be quite ruggedly constructed. The pigging apparatus of FIG. 1 would be inserted into the pipeline at a pumping station using a trap of the type employed to insert scrapers, and since the distance between pumping stations averages about fifty miles, the pig must be able to traverse such distances without recharging batteries, replacing tape reels, etc. Considerations of this type compel construction of the pipeline inspection pig in the manner indicated.

The pipeline inspection pig of FIG. 1 includes three separate sections, the first being a magnetizing and propulsion or drive section 11, followed by an intermediate section 12 containing the detectors or transducers, and finally by a trailing section 13 containing the power supply, instrumentation and recording circuitry and mechanisms. The drive section 11 is coupled to the transducer section 12 by a universal joint 14, while a similar universal joint 15 couples the transducer section to the trailing section 13.

The drive section 11 includes front and rear packers 16 and 17, each of which includes a cup portion having a periphery urged tightly against the circumference of the pipeline wall so that fluid pressure will be trapped on the right-hand side of these packers, tending to propel the driving section 11, and thus the entire assembly, through the pipeline from right to left under propulsion of the fluid product being transported. A nosepiece 18 on on the front of the driving section is dome-shaped so that if the nose of the pig drops partially into a side entry at a trap or pumping station, the nosepiece will strike the edge of the pipe and deflect the pig back to the proper path. A lifting eye 19 in the front of the nosepiece is for convenience in handling the pig with portable cranes or lift hoists, it being noted that the pigging assembly is quite heavy, especially for large diameter pipes. A bypass port 20 permits fluid to bypass the driving cup 16 when the speed of the pigging assembly is excessive, a valve 21 opening or closing this valve bypass port in response to speed. When the valve 21 is closed against the seat, the port will be sealed and so the assembly will move at approximately the velocity of the fluid product. However, when the velocity is excessive, creating undue wear and abrading of the parts of the inspection pig due to collisions with debris, obstructions, icicles at weld seams and the like, the valve 21 is opened so that the fluid product passes through the port 20 and out through the holes in the nosepiece 18, lowering the pressure differential across the driving packer 16 and thus lowering the speed of the assembly. The valve 21 may be operated by line pressure in a double-acting piston and cylinder arrangement controlled by a solenoid valve actuated in response to the velocity as may be detected by a wheel engaging the pipeline wall. A speed control system for a pipeline inspection pig of this type is described in copending application Ser. No. 680,552, filed herewith, and assigned to the assignee of the present invention.

The mechanism for magnetizing the pipeline wall in a circumferential direction is provided in accordance with the invention by an arrangement of brushes positioned between the two packers 16 and 17 in the driving and magnetizing section 11. The brushes are mounted exterior to a central cylindrical housing 23 which contains the circuitry for driving the magnetizing pulser as will be described, along with the necessary batteries or fuel cells as a power supply. The brush arrangement includes a front set of brushes 24 and a rear set 25. The conductive wire brushes 24 are mounted on conductive spring-like arms 26 which are secured to a conductive annulus 27, the annulus being mounted around and insulated from the cylinder 23 by a bushing 28. In like manner, the rear brushes 25 are mounted on spring arms which are secured to a conductive annulus 29 surrounding the cylinder 23 but insulated therefrom.

The pipeline wall is magnetized by the effect of current flowing between the set of brushes 24 and the set of brushes 25 through the pipeline wall parallel to the axis of the pipeline. Preferably this current is in the form of current pulses of extremely high magnitude but of short duration, up to $10^5$ amperes for a few milliseconds. Circuitry for energizing the brushes will be described below. The magnitude of current needed depends upon the pipe diameter and wall thickness; however, little or no problem is incurred by using excess current other than undue drain and short life of the batteries. The use of current below a certain minimum is to be avoided because the residual circumferential magnetic field remaining in the pipeline wall will be less than that desired for optimum sensitivity to longitudinal cracks.

Current pulses are appled to the brushes 24 and 25 at a pulse repetition rate such that as the pig travels down the pipeline, the magnetized areas resulting from adjacent current pulses overlap enough to produce a uniform residual circumferential field in the pipe wall. For example, if the brushes 24 and 25 are about two feet apart and the maximum pig velocity is about two feet per second, then the pulse rate to insure overlap is somewhat more than one per second. A technique which is much more conservative of battery power is to vary the pulse repetition rate for current pulses applied to brushes 24 and 25 in response to the actual velocity of the pig rather than use a fixed repetition rate high enough in frequency to accommodate the maximum velocity. Circuitry for providing this function will be described below. In either event, a uniform continuous circumferential residual magnetic field is provided in the pipeline wall as the magnetizing assembly 11 travels along the line. Since the current flows longitudinally or parallel to the pipeline axis between the brushes 24 and 25, the magnetic field produced will be perpendicular to this; i.e., will encircle the pipeline as needed to detect longitudinal cracks.

It may be noted that the magnetizer unit 11 may be a separate pig which is run through the pipeline independently of and preceding the inspection or detector unit. While such a procedure may offer some flexibility in operation and avoid some magnetic noise in the form of flux leakage in the pulsing unit in the vicinity of the detectors, it is nevertheless ordinarily preferable because of decay of the magnetic field with time to run the units coupled together as shown. If run separately, a period of several hours might transpire between the magnetizing run and the inspection run because it is preferable that two pigs not be in a given section between pumping stations at one time; since the pumping stations are ordinarily about fifty miles apart, it requires several hours for a pig to traverse this distance.

A critical period in the operation of the magnetizer unit is during the time just after it is placed in the launch barrel or trap and the barrel is being brought up to line operating pressure. If the pulser is operating during this period, an explosive hazard may result because there may be a combustible mixture of gas and air in the barrel. As the first gas is bled into the barrel and mixed with the residual air in the barrel, a flash hazard exists in the presence of the passage of high current pulses into the pipe wall. To avoid this problem, the barrel may be purged at low pressure using a $CO_2$ fire extinguisher, or even with methane gas, so long as the current pulser is not turned on until after purging and after the launch barrel is brought up to line pressure. To this end, a pressure swich 30 is located in the cylinder 23 in a chamber exposed to line pressure. The pressure switch is adapted to close electrical contacts when a selected high pressure is reached, the pulser circuit being deactivated until this switch is closed as will be seen in the circuits explained in detail below. Thus, the pulser does not start until the purge is complete and the barrel pressure is increased to a level sufficient to close the pressure switch. Likewise, the pulsing unit will stop as soon as the pressure is bled off in the recovery trap barrel after an inspection run is completed so that no explosive hazard occurs when the barrel is opened to remove the pig.

The pigging apparatus will tend to settle toward the bottom of the pipeline under its own weight, even though partially supported by the resilient rubber packers. To maintain the pig centered along the axis of the pipeline, a centralizer assembly is often utilized at the rear of each section of the pigging apparatus. The centralizer assembly includes a plurality of wheels 32, ordinarily three spaced at 120° positions, mounted on pivoted arms 33 which are urged in an outward direction by an equal amount by a spring-biased drum 34 on which extended portions 35 of the arms 33 rest. A similar centralizer assembly including wheels 32, pivoted arms 33, spring-biased drum 34, etc., may be employed at the rear end of each of the other sections of the pigging assembly including the transducer section 12 and the instrumentation package 13 as seen in FIG. 1.

The transducer section 12 in the pigging assembly of FIG. 1 basically consists of one or more detector shoes adapted to rotate about the axis of the pig and to circumferentially scan the interior wall of the pipeline to detect magnetic flux deflected out of the pipeline wall by longitudinal cracks. The transducer section includes a central cylindrical housing 36 supported by front and rear packers 37 and 38 which are vented to permit the fluid product in the line to pass through and bear upon the driving packer 16. One or more detector shoe assemblies 40 and 41 are pivotally secured to a rotating central section 42 which is powered to rotate about the axis of the section 12.

With reference to FIG. 1a, a section of pipeline is shown which contains a group of the so-called stress corrosion cracks, these being longitudinally oriented random cracks extending radially inward starting at the outer surface of the pipeline wall. These cracks are very narrow and would not deflect magnetic flux out of the wall to an extent which would be easily detectable if the flux were longitudinal, so it is for this reason that circumferential flux is utilized. As seen in FIG. 1b, residual magnetic flux is produced which encircles the pipeline within the metal walls, and so the detector shoes 40 and 41 intercept flux deflected out by the cracks. If simple coils are used to detect leakage flux, the magnitude of signals produced will be dependent upon the speed of rotation of the shoes 40 and 41, so this rate should be fairly high and also fairly uniform.

Figure 3:
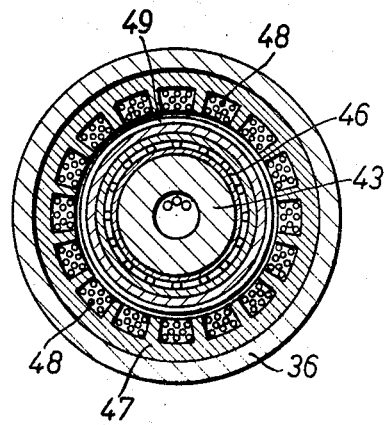
FIG. 3 is an elevation view in section of the apparatus of FIG. 2, taken along the line 3—3 in FIG. 2.

Referring now to FIG. 2, a mechanism for rotating the detector shoes will be described. The cylindrical rotating center section 42 of the transducer section is shown in detail along with a three-phase AC induction motor arrangement for driving the center section 42 as the rotor of an induction motor. The section 12 includes a central core in the form of a hollow shaft 43 having a through bore 44 for threading the electrical cables used to connect the various electrical or electronic circuitry with the power supplies, recording circuitry, etc. The central section 42 is mounted for free rotation about the center shaft 43 by a pair of circular ball bearing assemblies 45 and 46. The central section 42 thus acts as a rotor of an induction motor, with the stator including a core 47, seen in FIG. 3, along with windings 48. The windings 48 are arranged identically to the stator windings of a three-phase induction motor so that the rotating field generated by these windings causes flux to penetrate a soft iron cylindrical sleeve 49 in the rotor. The sleeve 49 is copper clad and tends to turn due to eddy currents generated in the highly conductive copper cladding. The sleeve 49 is flanged outwardly, and another flanged, highly conductive sleeve 50 surrounds the stator winding so that the flux generated by the AC stator winding will be isolated and not interfere with the flux leakage detector devices. The central rotor member 42 is preferably nonmagnetic. An electrical cable 51 connects the stator winding 48 with the three-phase power supply through the central bore 44.

Figure 4:
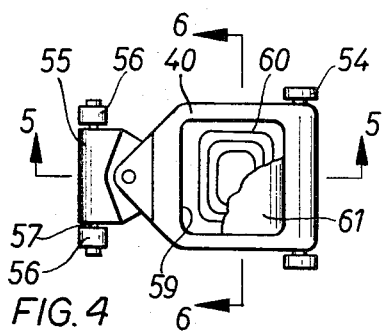
FIG. 4 is a plan view of one of the detector shoe assemblies used in the inspection apparatus of FIG. 1.
Figure 5:
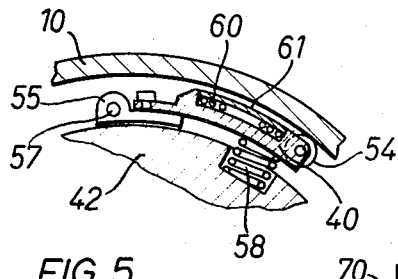
FIG. 5 is an elevation view in section of the detector shoe assembly of FIG. 4, taken along the line 5—5 in FIG. 4.

Referring now to FIGS. 4 and 5, one embodiment of the detector shoes 40 and 41 is illustrated. The detector shoe 40 is curved to generally match the interior diameter of the pipeline wall 10 and includes wheels 54 mounted on an axle extending through the shoe 40 to aid in allowing the face of the shoe 40 to move freely across the interior surface of the pipeline. It is noted that the wheels 54 may be omitted to permit the face of the detector shoe 40 to frictionally engage the pipeline interior, although considerable abrasion and heating may result. The shoe 40 is pivotally mounted to a bracket 55 which in turn is secured to mounting studs 56 which are part of the rotor 42, a pivot pin 57 permitting the bracket 55 to pivot relative to the studs. Variations in the diameter of the pipeline, or obstructions such as weld seams or debris, cause radial movement of the detector shoe 40 which is accommodated by rotation of the bracket 55 about the pivot pin 57. The detector shoe 40 is urged outwardly against the pipe wall by a compressed spring 58 between the detector shoe and the rotor 42. The detector shoes will be urged outwardly by centrifugal force which may be sufficient to dispense with use of the springs 58.

Figure 6:
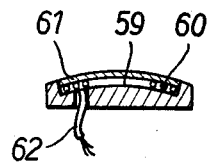
FIG. 6 is an elevation view in section of the detector shoe assembly in FIG. 4, taken along the line 6—6 in FIG. 4.

Located in a recess 59 in the face of the detector shoe is a flux leakage detector coil 60 which may be merely several turns of conductive wire. The search coil 60 is mounted beneath a protective shim 61 formed of nonmagnetic material such as stainless steel thin enough to permit the search coil to scan closely adjacent the interior wall surface. The detector coils 60 in the detector shoes 40 and 41 are connected by electrical cables 62 seen in FIGS. 2 and 6, and thus to signal transformer primaries 63 mounted on the interior circumference of the rotor 42 as seen in FIG. 2. The signals from the detector shoes are picked up by signal transformer secondary windings 64 mounted on the nonrotating shaft 43. In either case, signals from the detector shoes are connected by cables 65 to the instrumentation and recorder circuitry in the section 13. It may be noted that other detectors may be used instead of the coils 60, such as the magnetic cores with Hall effect sensors disclosed in copending application Ser. No. 680,572, filed herewith and assigned to the assignee of this invention.

Figure 7:
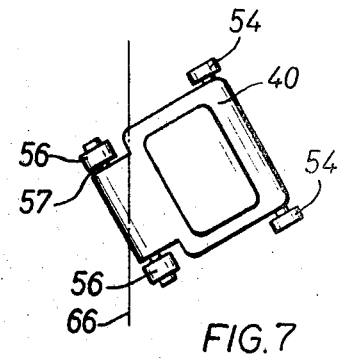
FIG. 7 is a plan view of another embodiment of the detector shoe assembly used in the inspection apparatus of FIG. 1.

While the pigging assembly is standing still, not moving through the pipeline, the detector shoes rotate about a true central axis of the pipeline, but this is not the usual situation since the pig is ordinarily traveling along the pipeline at up to several feet per second. For this reason the path defined by the detector shoes along the inside wall of the pipeline will resemble a helix. Thus the position of the detector shoe relative to the axis of the pipeline will be slightly canted, the angle depending upon the speed of travel of the pigging assembly and the speed of rotation of the rotor 42. For this reason, the shoe 40 is pivoted relative to the mounting bracket 55, and also this requires that the face of the shoe 40 be curved in both longitudinal and transverse directions rather than being a section of a cylindrical surface, i.e., the face of the shoe 40 is convex and seen by the orthogonal sectional views of FIGS. 5 and 6. An alternative arrangement is to position the pivot pin 57 and mounting studs 56 at an angle on the rotor 42 relative to an axis 66 of the rotor as seen in FIG. 7. For typical speeds and r.p.m. of the rotor, the angle between the pivot pin 57 and the axis 66 would be about 20°. In this manner, the detector shoe 40 is directly connected to the pivot pin 57 rather than using the mounting bracket 55 as before. In any event, the use of a pivoted arrangement or canting of the mounting axis for the detector shoes 40 and 41 avoids undue slippage and abrasion of the wheels 54 or the face of the detector shoes as the shoes define helical paths along the interior surface of the pipeline.

Figure 8:
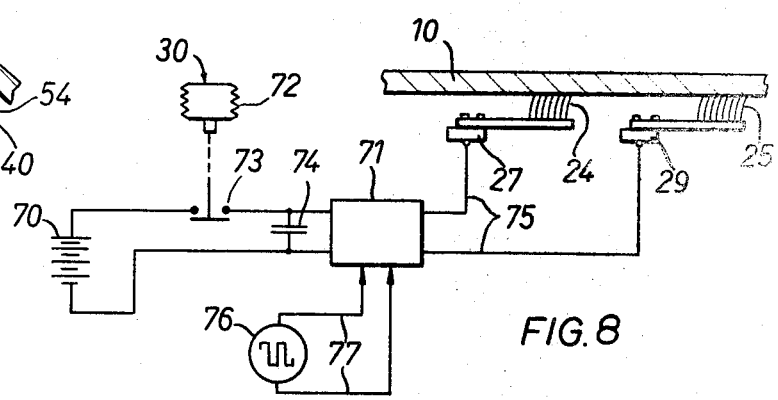
FIG. 8 is an electrical diagram in schematic form of the circuitry used for energizing the magnetizing device in the inspection apparatus of FIG. 1.
Figure 9:
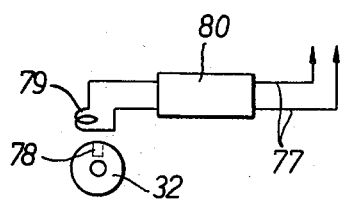
FIG. 9 is a schematic representation of a speed detector which may be used with the circuitry of FIG. 8.

Referring now to FIG. 8, circuitry for applying high magnitude current pulses at periodic intervals to the wire brushes 24 and 25 is illustrated. A DC power supply which may be batteries 70 as shown, or a turbo generator operating from fluid pressure in the line, is located either in the cylinder 23 or in the power package 13 in the trailing section. The battery 70 is connected to a switching or pulsing circuit 71 through the pressure switch 30. The pressure switch may comprise a bellows device 72 operating normally open single-pole, single-throw contacts 73 according to conventional practice. When the pressure is in excess of a given magnitude, the bellows will collapse to a degree permitting the switch 73 to close and thus power is applied to the pulsing circuit 71. The pulsing circuit 71 may comprise a switching device such as a controlled rectifier or the like which when closed permits a capacitor 74 to discharge through the brushes and the pipeline wall by connections 75. The switching device in the pulser 71 is operated by a timing pulse generator such as a multivibrator 76 connected by a line 77 to the pulsing circuit 71. Alternatively, the pulsing circuit 71 may be operated in response to the speed of the pig through the pipeline, an arrangement as seen in FIG. 9. Here a magnetic slug 78 is mounted in a recess in one of the wheels 32 for the centering mechanism and a pickup coil mounted on the pivot arm for this wheel thus produces a pulse for each revolution of the wheel. The output of the pickup coil 79 is applied to a register 80 which produces an output pulse on the lines 77 going to the pulser 71 for every several pulses produced by the coil 79, the number registered on the counter 80 before producing a pulse on the line 77 depending upon the ratio of the circumference of the wheel 32 to the distance between the brushes 24 and 25. In this manner, the time interval between pulses is dependent upon distance traveled down the pipeline so that it is assured that the magnetized sections will overlap.

Figure 10:
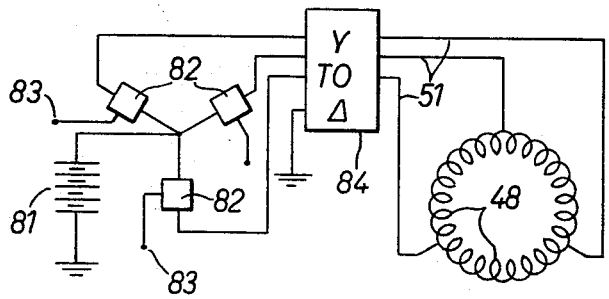
FIG. 10 is an electrical diagram in schematic form of the three-phase power supply used to energize the stator of the induction motor arrangement for rotating the detector shoe assemblies in the inspection apparatus of FIG. 1.

With reference now to FIG. 10 of the drawings, a three-phase power supply for the stator winding 48 of the induction motor used to drive the rotor 42 is illustrated. A DC to three-phase inverter is needed to convert DC power supplied by a battery 81 or equivalent generator or fuel cell to three-phase AC. It is noted that the battery 81 may be located in the power pack or in the cylinder 23. The DC to three-phase inverter may comprise three switch devices 82 which are closed in response to trigger signals applied to inputs or gates 83. The switching devices 82 may be silicon controlled rectifiers, for example, which are triggered by pulses from a synchronized pulse source. The frequency of the AC power produced may be varied by varying the timing of the trigger pulses supplied to the gates 83. For example, the frequency may be varied in response to the speed of the pig by using magnetic pickups similar to that of FIG. 9 to generate pulses for driving the gates 83 at varying time intervals. The outputs of the switches 82 are applied to a Y-to-Δ transformer 84, the output of which is connected by the lines 51 to the stator windings 48.

Figure 11:
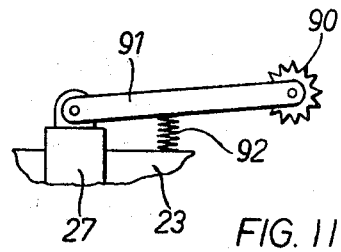
FIG. 11 is a detail view of another device for coupling the current pulses into the pipe wall, spurs being used instead of wire brushes in this embodiment.

The usual procedure is to run a scraper pig of conventional design through the line several times before the inspection run is made in order to remove rust and debris from the interior of the pipeline and to scratch through any adherent material that might be on the inside of the pipeline so that the brushes will conductively engage the pipeline walls. This increases the effectiveness of the inspection run. The wire used in the current conducting brushes 24 and 25 may be a copper alloy such as beryllium copper to provide good conductivity along with wear resistance and strength, or copper plated steel wires may be used; however, the diameter and the alloy material for the wire bristles are selected for maximum conduction of current to the steel walled surface and for minimum arcing to the steel wall. Instead of the several separate brushes shown, a pair of continuous annular brushes may be used to conduct current pulses to the pipewalls. It may be noted that conductive rubber could be used for the forward and rear packer rubbers 16 and 17 in place of using separate wire brushes. It is preferred, however, to use brushes due to the high resistance of such conductive resillient material, more power being required from the pulser and more power being dissipated in the higher resistance rubber cups. Alternatively, spurs of the type shown in FIG. 11 may be used in place of the wire brushes 24 and 25. Each of the spurs 90 is mounted on a pivoted arm 91 of conductive material, the arms being connected to a conductive annulus 27 as before. A spring 92 suitably insulated would urge the spur against the pipewall. The points on the spurs would penetrate any coating which may exist on the interior of the pipeline wall so that conductive contact is assured.

The power supply, instrumentation and recording section 13 is generally of conventional design and includes channels for amplifying and filtering the signals generated in the detector shoes 40 and 41, along with a multichannel magnetic recording deck of standard form. The batteries, electronic circuitry, tape deck, etc., are contained within a sealed cylinder 85 which is supported between front and rear vented packers 86 and 87. A resilient bumper or sleeve 88 may surround the rear part of the housing to prevent damage to the cylinder 85 when the pig passes through a valve seat and the rear end drops down into the seat as often occurs.

Figure 12:
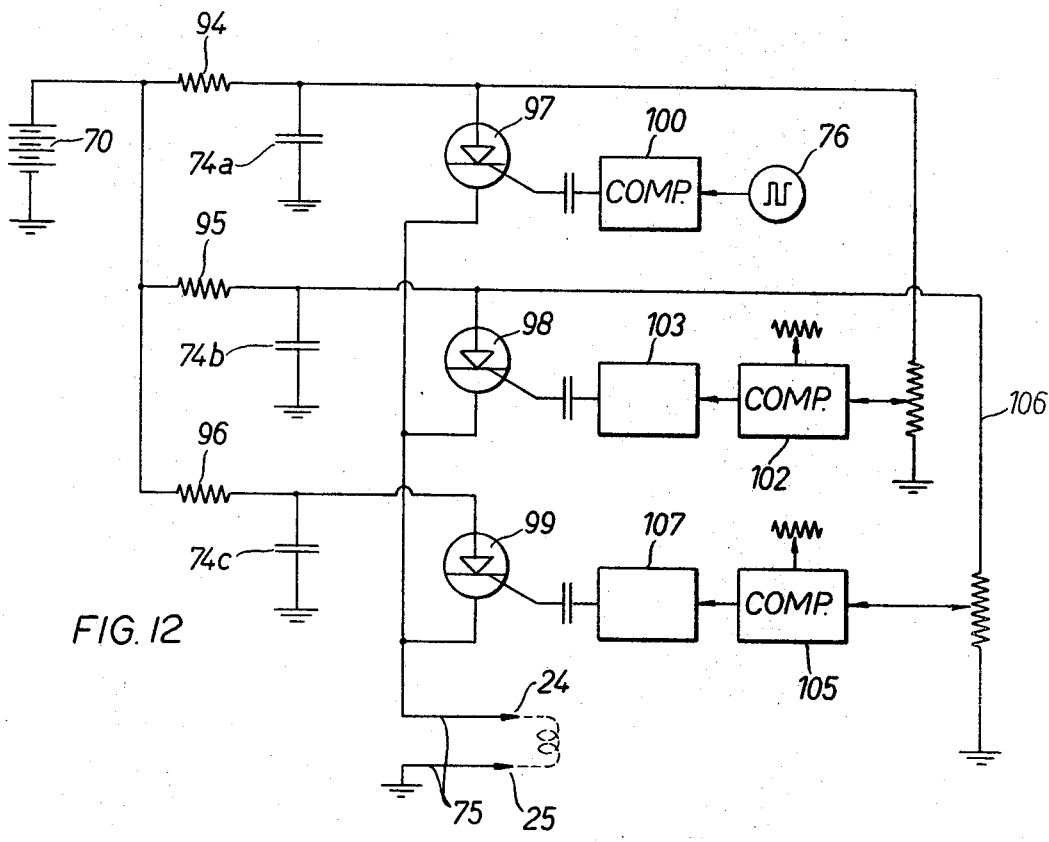
FIG. 12 is a graphic representation of waveforms of current pulses produced by the circuitry of FIG. 12.
Figure 13:
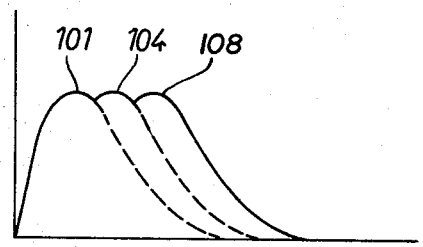
FIG. 13 is a graphic representation of waveforms of a circuit for producing magnetization current pulses, although it is understood that this circuitry has independent utility.

The circuit of FIG. 8 for discharging the capacitor through the pipewall 10 via the brushes 24 and 25 preferably is a low impedance circuit so that the current amplitude is quite high, producing a high magnetization level. The low discharge impedance, however, results in a very rapid discharge, sometimes only a few microseconds in length, whereas higher magnetization levels would be provided by longer pulse widths. To increase the duration of the magnetizing current pulse at an amplitude sufficient to magnetize the pipe wall, the circuit of FIG. 12 may be employed. This circuit utilizes three banks of capacitors 74a, 74b and 74c, although any number might be used. The capacitors 74a–74c are charged to the voltage of the battery 70 through separate series resistors 94–96, and these capacitors may be sequentially discharged through the brushes 24 and 25 and the pipe wall 10 by triggering a series of SCR's 97, 98 and 99. The first controlled rectifier 97 is turned on by a pulse from a conventional trigger circuit 100, which receives an input from the source 76, producing current through the load as indicated by a pulse 101 in FIG. 13. When the voltage across the SCR 97 has decayed to a certain level as detected by a comparator 102, a trigger circuit 103 will apply a trigger pulse to the gate of the SCR 98, turning on the device and discharging the capacitor 74b through the load and producing another circuit pulse 104. Thence, when the voltage across the SCR 98 has decayed to a level established by a comparator 105, receiving this voltage by a line 106 and a divider, then a pulse is applied to the gate of the SCR 99 by a trigger circuit 107. This will discharge the capacitor 74c through the load, providing another pulse 108 as seen in FIG. 13. A wider, high current pulse in the pipe wall is the resultant. The voltage comparators 102 and 105 are constructed so that the turn-on of a particular rectifier may be made to occur when the voltage of the previous capacitor bank has dropped a preselected amount. For example, if the comparators fire when the previous capacitors reach 30% of full voltage, then more than 90% of the total energy stored in the capacitor banks will still be delivered to the load. Of course, the total energy supplied by all the capacitors will be no more when fired sequentially than if all were connected in parallel and fired together, but pulse duration will be increased while peak current amplitude reduced. This type of circuitry as seen in FIG. 12 has utility as in employing a current rod for magnetizing a tube; it is noted that very short current pulses do not magnetize the tube wall to a very great penetration depth. Since sequential firing allows adjustment of the pulse width, it also allows adjustment of the relative magnetization of the innermost part of the tube wall as compared to the outermost part. This feature may be used to compensate for lack of inside sensitivity when outside scanning is used.

While the invention has been described with reference to particular embodiments, this description is not meant to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. Pipeline inspection apparatus adapted to pass through the interior of a section of pipeline for detecting cracks or the like extending generally longitudinally with respect to the axis of the section of the pipeline being inspected, wherein said section of pipeline is magnetizable and capable of conducting an electrical current, the apparatus comprising:

means for moving said apparatus through the pipeline section, first and second electrical current conducting means carried by said apparatus and longitudinally spaced on the apparatus for making movable conductive contact with the wall of said section of pipeline at respective longitudinally spaced regions thereof, current producing means carried by the apparatus and connected to said conductive contacts for producing a unidirectional current that flows longitudinally through the wall of said section of pipeline between said spaced regions, said current producing means establishing in the wall of the pipeline section a current of sufficient magnitude to establish a circumferential residual magnetic field in said wall between said spaced regions, flux leakage detector means carried by said apparatus and adapted to be rotated about the axis of the apparatus to scan the interior wall of the section of pipeline to detect magnetic flux of the residual magnetic field which is deflected out of the wall by a longitudinally extending crack or the like and for producing electrical signals indicative of the detected flux, means controlling said current producing means for providing reoccurring current pulses that flow longitudinally through respective overlapping lengths of said section of pipeline as said current conducting means move longitudinally therethrough, whereby the section of pipeline being inspected is circumferentially magnetized continuously throughout its length, said controlling means including a plurality of capacitors and means for sequentially discharging the capacitors in a time sequence to produce a current pulse having a duration longer than the discharge time of any one of the capacitors.

2. Pipeline inspection apparatus adapted to pass through the interior of a section of pipeline for detecting cracks or the like extending generally longitudinally with respect to the axis of the section of the pipeline being inspected, wherein said section of pipeline is magnetizable and capable of conducting an electrical current, the apparatus comprising:

means for moving said apparatus through the pipeline section, first and second electrical current conducting means carried by said apparatus and longitudinally spaced on the apparatus for making movable conductive contact with the wall of said section of pipeline at respective longitudinally spaced regions thereof, current producing means carried by the apparatus and connected to said conductive contacts for producing a unidirectional current that flows longitudinally through the wall of said section of pipeline between said spaced regions, said current producing means establishing in the wall of the pipeline section a current of sufficient magnitude to establish a circumferential residual magnetic field in said wall between said spaced regions, flux leakage detector means carried by said apparatus and adapted to be rotated about the axis of the apparatus to scan the interior wall of the section of pipeline to detect magnetic flux of the residual magnetic field which is deflected out of the wall by a longitudinally extending crack or the like and for producing electrical signals indicative of the detected flux, means controlling said current producing means for providing reoccurring current pulses that flow longitudinally through respective overlapping lengths of said section of pipeline as said current conducting means move longitudinally therethrough, whereby the section of pipeline being inspected is circumferentially magnetized continuously throughout its length, and means for preventing pulses of current from being applied to said current conducting means when the pressure surrounding said apparatus is less than a selected magnitude.

3. Pipeline inspection apparatus adapted to pass through the interior of a section of pipeline for detecting cracks or the like extending generally longitudinally with respect to the axis of the section of the pipeline being inspected, wherein said section of pipeline is magnetizable and capable of conducting an electrical current, the apparatus comprising:

means for moving said apparatus through the pipeline section, first and second electrical current conducting means carried by said apparatus and longitudinally spaced on the apparatus for making movable conductive contact with the wall of said section of pipeline at respective longitudinally spaced regions thereof, current producing means carried by the apparatus and connected to said conductive contacts for producing a unidirectional current that flows longitudinally through the wall of said section of pipeline between said spaced regions, said current producing means establishing in the wall of the pipeline section a current of sufficient magnitude to establish a circumferential residual magnetic field in said wall between said spaced regions, flux leakage detector means carried by said apparatus and adapted to be rotated about the axis of the apparatus to scan the interior wall of the section of pipeline to detect magnetic flux of the residual magnetic field which is deflected out of the wall by a longitudinally extending crack or the like and for producing electrical signals indicative of the detected flux, means controlling said current producing means for providing reoccurring current pulses that flow longitudinally through respective overlapping lengths of said section of pipeline as said current conducting means move longitudinally therethrough, whereby the section of pipeline being inspected is circumferentially magnetized continuously throughout its length, said controlling means including velocity-responsive means for controlling the rate of occurrence of said current pulses as a function of the velocity of said apparatus through said pipeline section.

4. Pipeline inspection apparatus according to claim 1 wherein the means for sequentially discharging includes a plurality of controlled switches separately connecting the capacitors to the current conducting means, at least some of the switches being rendered conductive selectively in response to discharge of other ones of the capacitors.

References Cited

UNITED STATES PATENTS

| | | | |
|---|---|---|---|
| 2,136,375 | 11/1938 | De Forest | 324—38 |
| 2,185,589 | 1/1940 | Drake et al. | 324—37 |
| 2,440,044 | 4/1948 | Greenslade | 324—64 |
| 2,553,350 | 5/1951 | Bayhi | 324—34 |
| 2,995,701 | 8/1961 | Lloyd | 324—37 |
| 2,998,566 | 8/1961 | Cochran | 324—37 |
| 3,238,448 | 3/1966 | Wood et al. | 324—37 |

OTHER REFERENCES

Kodis et al.: Crawler Detects Gun-Barrel Cracks; Electronics, September 1951 pp. 92–95.

RUDOLPH V. ROLINEC, Primary Examiner

R. J. CORCORAN, Assistant Examiner